(12) United States Patent
Chen et al.

(10) Patent No.: US 10,110,706 B2
(45) Date of Patent: Oct. 23, 2018

(54) REMOTE ACCESS METHOD AND DEVICE

(71) Applicant: Huawei Technologies Co., Ltd., Shenzhen (CN)

(72) Inventors: Qiulin Chen, Shanghai (CN); Jianhua Zhu, Hangzhou (CN); Shangshun Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 14/704,272

(22) Filed: May 5, 2015

(65) Prior Publication Data

US 2015/0237169 A1 Aug. 20, 2015

Related U.S. Application Data

(63) Continuation of application No. PCT/CN2013/078739, filed on Jul. 3, 2013.

(30) Foreign Application Priority Data

Nov. 5, 2012 (CN) .......................... 2012 1 0434947

(51) Int. Cl.
*H04L 29/06* (2006.01)
*G06F 17/30* (2006.01)
*H04L 29/08* (2006.01)

(52) U.S. Cl.
CPC ........ *H04L 67/42* (2013.01); *G06F 17/30864* (2013.01); *H04L 63/08* (2013.01);
(Continued)

(58) Field of Classification Search
USPC ............ 726/7, 2, 21, 36; 713/150, 163, 181; 380/255, 264, 276
See application file for complete search history.

(56) References Cited

U.S. PATENT DOCUMENTS 9,525,998 B2 * 12/2016 Sheth .................... H04L 67/38
2010/0166004 A1 * 7/2010 Wang ................. H04L 12/2809
370/401
(Continued)

FOREIGN PATENT DOCUMENTS

CN 101075976 A 11/2007
CN 101741901 A 6/2010
(Continued)

OTHER PUBLICATIONS

Foreign Communication From a Counterpart Application, European Application No. 13850504.5, European Office Action dated Apr. 10, 2017, 4 pages.
(Continued)

*Primary Examiner* — Sharif E Ullah
(74) *Attorney, Agent, or Firm* — Conley Rose, P.C.

(57) ABSTRACT

A remote access method and device are provided. The method includes acquiring, by a local area network terminal, information about accessible content on at least one online device in the local area network; aggregating, by the local area network terminal, the information about the accessible content on the at least one online device; and sending, by the local area network terminal, the aggregated information about the accessible content on the at least one online device to a remote client, so that the remote client presents the information about the accessible content on the at least one online device.

12 Claims, 7 Drawing Sheets

(52) U.S. Cl.
CPC .............. *H04L 67/02* (2013.01); *H04L 67/10* (2013.01); *H04L 67/141* (2013.01)

(56) References Cited

U.S. PATENT DOCUMENTS

2010/0312851 A1* 12/2010 Jackson ................ H04L 67/104 709/217
2012/0158900 A1* 6/2012 Kim .................... H04L 12/6418 709/217

FOREIGN PATENT DOCUMENTS

| CN | 101867583 A | 10/2010 |
| WO | 2005004387 A1 | 1/2005 |
| WO | 2006090243 A1 | 8/2006 |
| WO | 2006112662 A1 | 10/2006 |
| WO | 2012000553 A1 | 1/2012 |

OTHER PUBLICATIONS

Partial English Translation and Abstract of Chinese Patent Application No. CN101075976A, May 7, 2015, 4 pages.
Partial English Translation and Abstract of Chinese Patent Application No. CN101867583A, May 7, 2015, 5 pages.
Partial English Translation and Abstract of Chinese Patent Application No. CN101741901A, Jul. 9, 2015, 13 pages.
Foreign Communication From a Counterpart Application, PCT Application No. PCT/CN2013/078739, English Translation of International Search Report dated Aug. 29, 2013, 2 pages.
Foreign Communication From a Counterpart Application, PCT Application No. PCT/CN2013/078739, English Translation of Written Opinion dated Aug. 29, 2013, 9 pages.
Foreign Communication From a Counterpart Application, European Application No. 13850504.5, Extended European Search Report dated Oct. 8, 2015, 6 pages.

* cited by examiner

REMOTE ACCESS METHOD AND DEVICE

CROSS-REFERENCE TO RELATED APPLICATIONS

This application is a continuation of International Application No. PCT/CN2013/078739, filed on Jul. 3, 2013, which claims priority to Chinese Patent Application No. 201210434947.4, filed on Nov. 5, 2012, both of which are hereby incorporated by reference in their entireties.

TECHNICAL FIELD

Embodiments of the present invention relate to the field of communications technologies, and in particular, to a remote access method and device.

BACKGROUND

With the development of cloud application technologies, a cloud provides a variety of services for users. Users require that they can access services at any time and any place, including that a user remotely accesses a device in a local area network (for example, a home network) conveniently by using a remote device (also referred to as a "remote client", for example, a mobile phone or a laptop computer) in a remote network.

An existing Universal Plug and Play Remote Access (Upnp-RA) technology implements an interconnection between a remote device and a device in a home network. The remote device is connected to the device in the home network through a secure transmission channel. A first basis for the Upnp-RA technology is the Simple Service Discovery Protocol (SSDP) protocol, and in a system structure of Upnp-RA, a Remote Access Discovery Agent (RADA) is used in a remote network and a home network to listen to a local SSDP message to discover an available device and a service status of the device. A second basis for the Upnp-RA technology is the Hypertext Transfer Protocol (HTTP) protocol, and in a system structure of Upnp-RA, a Remote Access Transport Agent (RATA) is used to implement transmission of information between a remote device and a device in a home network. The remote network and the home network implement synchronization of a current available device and a service status of the device by using their respective RADA Synchronization (RADASync). For example, when a service status of a device in the home network changes (for example, from available to unavailable), the home network implements update of the service status of the device by using RADASync, sends updated information to the remote network by using the RATA, and the remote network also updates the current service status of the device in the home network by using RADASync. However, the remote device needs to acquire address information of the device in the home network.

In addition, in the terms of ensuring security of remote access, a Secure Sockets Layer Virtual Private Network (SSL VPN) solution is relatively complex and needs support of an operator. A remote device needs to know an address of a Remote Access Server (RAS) in a local area network, and a user further needs to configure an address on the RAS, which is relatively troublesome and inconvenient.

SUMMARY

Embodiments of the present invention provide a remote access method and device, so that a remote client can perform remote access in a simpler and more convenient manner.

According to a first aspect, a remote access method is provided, where the method includes acquiring, by a local area network terminal, information about accessible content on at least one online device in the local area network; aggregating, by the local area network terminal, the information about the accessible content on the at least one online device; and sending, by the local area network terminal, the aggregated information about the accessible content on the at least one online device to a remote client, so that the remote client presents the information about the accessible content on the at least one online device.

With reference to the first aspect, in a first implementation manner, before the acquiring, by a local area network terminal, information about accessible content on at least one online device in the local area network, specific implementation may be querying, by the local area network terminal, service statuses of devices in the local area network, and determining, among the devices in the local area network, the at least one online device whose service status is online.

With reference to the first aspect or the first possible implementation manner of the first aspect, in a second possible implementation manner, before the sending, by the local area network terminal, the aggregated information about the accessible content on the at least one online device to a remote client, specific implementation may be sending, by the local area network terminal, a first remote connection message to a public network server, where the first remote connection message carries a public network address and a port of the local area network terminal, so that the public network server sends the public network address and the port of the local area network terminal to the remote network client; and receiving, by the local area network terminal, a first remote access request message sent by the remote client; and the sending, by the local area network terminal, the aggregated information about the accessible content on the at least one online device to a remote client may be implemented as follows: sending, by the local area network terminal, the aggregated information about the accessible content on the at least one online device to the remote client according to the first remote access request message.

According to the second possible implementation manner of the first aspect, in a third possible implementation manner, specific implementation may be that the first remote connection message further carries first user information, so that the public network server searches for the corresponding local area network terminal according to second user information sent by the remote network client and the first user information.

According to the second possible implementation manner or the third possible implementation manner of the first aspect, in a fourth possible implementation manner, after the sending, by the local area network terminal, a first remote connection message to a public network server, specific implementation may be receiving, by the local area network terminal, second user information sent by the public network server; authenticating, by the local area network terminal, the remote network client according to the second user information; and sending, by the local area network terminal, confirmation information to the public network server.

With reference to the first aspect or any one of the first possible implementation manner to the fourth possible implementation manner of the first aspect, in a fifth possible implementation manner, after the sending, by the local area network terminal, the aggregated information about the accessible content on the at least one online device to a remote client, specific implementation may be receiving, by the local area network terminal, a second remote access request message sent by the remote client, where the second remote access request message carries information about content that the remote client requests to access, where the information is selected by the remote client from the information about the accessible content on the at least one online device; acquiring, by the local area network terminal according to the second remote access request message, the content that the remote client requests to access from a media server of a corresponding device; and sending, by the local area network terminal to the remote client, the content that the remote client requests to access.

According to the fifth possible implementation manner of the first aspect, in a sixth possible implementation manner, the acquiring, by the local area network terminal according to the second remote access request message, the content that the remote client requests to access from a media server of a corresponding device may be implemented as follows: if the media server of the corresponding device is a digital media server (DMS), initiating, by the local area network terminal, an HTTP request to the media server of the corresponding device; and receiving, by the local area network terminal, the content that the remote client requests to access sent by using the HTTP protocol by the media server of the corresponding device.

With reference to the first aspect or any one of the first possible implementation manner to the sixth possible implementation manner of the first aspect, in a seventh possible implementation manner, specific implementation may be receiving, by the local area network terminal, an Internet Protocol (IP) address and a port that are reported by a media server of the at least one online device, and maintaining a heartbeat connection to the media server of the at least one online device.

With reference to the first aspect or any one of the first possible implementation manner to the seventh possible implementation manner of the first aspect, in an eighth possible implementation manner, specific implementation may be that the information about the content includes at least one of the following: a name, a size, creation time, update time, a device where the content is located, and a path.

According to a second aspect, a remote access method is provided, where the method includes receiving, by a remote client, information about accessible content on at least one online device in a local area network sent by a local area network terminal; and presenting, by the remote client, the information about the accessible content on the at least one online device.

With reference to the second aspect, in a first possible implementation manner, before the receiving, by a remote client, information about accessible content on at least one online device in a local area network sent by a local area network terminal, specific implementation may be sending, by the remote client, a second remote connection message to a public network server, where the second remote connection message carries a public network address and a port of the remote client; receiving, by the remote client, a public network address and a port of the local area network terminal that are sent according to the second remote connection message by the public network server; and sending, by the remote client, a first remote access request message to the local area network terminal, so that the local area network terminal sends the information about the accessible content on the at least one online device to the remote client according to the first remote access request message.

According to the first possible implementation manner of the second aspect, in a second possible implementation manner, specific implementation may be that the second remote connection message further carries second user information, so that the public network server authenticates the remote client according to the second user information, or the public network server searches for the corresponding local area network terminal according to the second user information and the first user information that is sent by the local area network terminal.

With reference to the second aspect or any one of the first possible implementation manner to the second possible implementation manner of the second aspect, in a third possible implementation manner, after the selecting, from the information about the content on the online device, information about content that the remote client requests to access, specific implementation may be selecting, by the remote client from the information about the accessible content on the at least one online device, information about content that the remote client requests to access; sending, by the remote client, a second remote access request message to the local area network terminal, where the second remote access request message carries the information about the content that the remote client requests to access; and receiving, by the remote client, the content that the remote client requests to access sent by the local area network terminal.

According to a third aspect, a remote access method is provided, where the method includes receiving, by a public server, a first remote connection message sent by a local area network terminal, where the first remote connection message carries a public network address and a port of the local area network terminal; receiving, by the public server, a second remote connection message sent by a remote network client, where the second remote connection message carries a public network address and a port of the remote network client; sending, by the public server, information about the public network address and the port of the local area network terminal to the remote network client according to the second remote connection message, so that the remote network client sends a first remote access request message to the local area network terminal.

With reference to the third aspect, in a first possible implementation manner, the second remote connection message further carries second user information, and after the receiving, by the public server, a second remote connection message sent by a remote network client, specific implementation may be authenticating, by the public server, the remote network client according to the second user information.

According to the first possible implementation manner of the third aspect, in a second possible implementation manner, before the sending, by the public server, information about the public network address and the port of the local area network terminal to the remote network client according to the second remote connection message, specific implementation may be sending, by the public server, the second user information to the local area network terminal, so that the local area network terminal authenticates the remote network client according to the second user information; and receiving, by the public server, confirmation information that is sent according to the second user information by the local area network terminal.

With reference to the third aspect or the first possible implementation manner or the second possible implementation manner of the third aspect, in a third possible implementation manner, before the sending, by the public server, information about the public network address and the port of the local area network terminal to the remote network client according to the second remote connection message, specific implementation may be searching for, by the public server, the corresponding local area network terminal according to the first user information and the second user information that is sent by the remote client.

According to a fourth aspect, a local area network terminal is provided, where the local area network terminal includes an acquiring unit configured to acquire information about accessible content on at least one online device in the local area network; an aggregation unit configured to aggregate the information about the accessible content on the at least one online device acquired by the acquiring unit; and a sending unit configured to send, to a remote client, the information about the accessible content on the at least one online device aggregated by the aggregation unit, so that the remote client presents the information about the accessible content on the at least one online device.

With reference to the fourth aspect, in a first possible implementation manner, the acquiring unit is further configured to query service statuses of devices in the local area network, and determine, among the devices in the local area network, the at least one online device whose service status is online.

With reference to the fourth aspect or the first possible implementation manner of the fourth aspect, in a second possible implementation manner, the sending unit is further configured to send a first remote connection message to a public network server, where the first remote connection message carries a public network address and a port of the local area network terminal, so that the public network server sends the public network address and the port of the local area network terminal to the remote network client; the local area network terminal further includes a first receiving unit configured to receive a first remote access request message sent by the remote client; and the sending unit is configured to send the aggregated information about the accessible content on the at least one online device to the remote client according to the first remote access request message.

According to the second possible implementation manner of the fourth aspect, in a third possible implementation manner, the first receiving unit is further configured to receive second user information sent by the public network server; the local area network terminal further includes an authentication unit, where the authentication unit is configured to authenticate the remote network client according to the second user information; and the sending unit is further configured to send confirmation information to the public network server.

With reference to the fourth aspect or any one of the first possible implementation manner to the third possible implementation manner of the fourth aspect, in a fourth possible implementation manner, the local area network terminal further includes a second receiving unit configured to receive a second remote access request message sent by the remote client, where the second remote access request message carries information about content that the remote client requests to access, where the information is selected by the remote client from the information about the accessible content on the at least one online device; where the acquiring unit is further configured to acquire, according to the second remote access request message, the content that the remote client requests to access from a media server of a corresponding device; and the sending unit is further configured to send, to the remote client, the content that the remote client requests to access.

According to the fourth possible implementation manner of the fourth aspect, in a fifth possible implementation manner, the sending unit is further configured to: if the media server of the corresponding device is a DMS, initiate an HTTP request to the media server of the corresponding device; and the second receiving unit is configured to receive the content that the remote client requests to access sent by using the HTTP protocol by the media server of the corresponding device.

With reference to the fourth aspect or any one of the first possible implementation manner to the fifth possible implementation manner of the fourth aspect, in a sixth possible implementation manner, the acquiring unit is further configured to receive an IP address and a port that are reported by a media server of the at least one online device, and maintain a heartbeat connection to the media server of the at least one online device.

According to a fifth aspect, a remote client is provided, where the remote client includes a receiving unit configured to receive information about accessible content on at least one online device in a local area network sent by a local area network terminal; and a presentation unit configured to present the information about the accessible content on the at least one online device received by the receiving unit.

With reference to the fifth aspect, in a first possible implementation manner, the remote client further includes a sending unit configured to send a second remote connection message to a public network server, where the second remote connection message carries a public network address and a port of the remote client; where the receiving unit is further configured to receive a public network address and a port of the local area network terminal that are sent according to the second remote connection message by the public network server; and the sending unit is further configured to send a first remote access request message to the local area network terminal, so that the local area network terminal sends the information about the accessible content on the at least one online device to the remote client according to the first remote access request message.

According to the first possible implementation manner of the fifth aspect, in a second possible implementation manner, the remote client further includes a selection unit configured to select, from the information about the accessible content on the at least one online device, information about content that the remote client requests to access; where the sending unit is further configured to send a second remote access request message to the local area network terminal, where the second remote access request message carries the information about the content that the remote client requests to access; and the receiving unit is further configured to receive the content that the remote client requests to access sent by the local area network terminal.

According to a sixth aspect, a public server is provided, where the public network server includes a receiving unit configured to receive a first remote connection message sent by a local area network terminal, where the first remote connection message carries a public network address and a port of the local area network terminal, where the receiving unit is further configured to receive a second remote connection message sent by a remote network client, where the second remote connection message carries a public network address and a port of the remote network client; and a sending unit configured to send information about the public network address and the port of the local area network terminal to the remote network client according to the second remote connection message, so that the remote network client sends a first remote access request message to the local area network terminal.

With reference to the sixth aspect, in a first possible implementation manner, the second remote connection message further carries second user information, and the public server further includes an authentication unit configured to authenticate the remote network client according to the second user information.

With reference to the sixth aspect or the first possible implementation manner of the sixth aspect, in a second possible implementation manner, the sending unit is further configured to send the second user information to the local area network terminal, so that the local area network terminal authenticates the remote network client according to the second user information; and the receiving unit is further configured to receive confirmation information that is sent according to the second user information by the local area network terminal.

With reference to the sixth aspect or the first possible implementation manner or the second possible implementation manner of the sixth aspect, in a third possible implementation manner, the public server further includes a search unit configured to search for the corresponding local area network terminal according to the first user information and the second user information that is sent by the remote client.

According to the embodiments of the present invention, a local area network terminal sends information about accessible content on at least one online device in a local area network to a remote client, so that the remote client can present the information about the accessible content on the online device in the local area network. Therefore, the remote client does not need to acquire address information of each online device in the local area network to separately access each online device to acquire information about accessible content on the online device. In this way, the remote client can perform remote access in a simpler and more convenient manner.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various mobile communications systems, such as a Global System for Mobile Communications (GSM), a Code Division Multiple Access (CDMA) system, a Wideband Code Division Multiple Access (WCDMA), a general packet radio service (GPRS), and Long Term Evolution (LTE).

A remote client is a remote device in a remote network, and may be a mobile terminal, for example, a mobile phone (or called a "cellular" phone) and a computer having a mobile terminal such as a portable, pocket-sized, handheld, computer built-in, or vehicle-mounted mobile apparatus, which exchanges language and/or data with a wireless access network. The remote network may be a public network or may be a local area network. It should be understood that this is not limited in the embodiments of the present invention.

Figure 1:
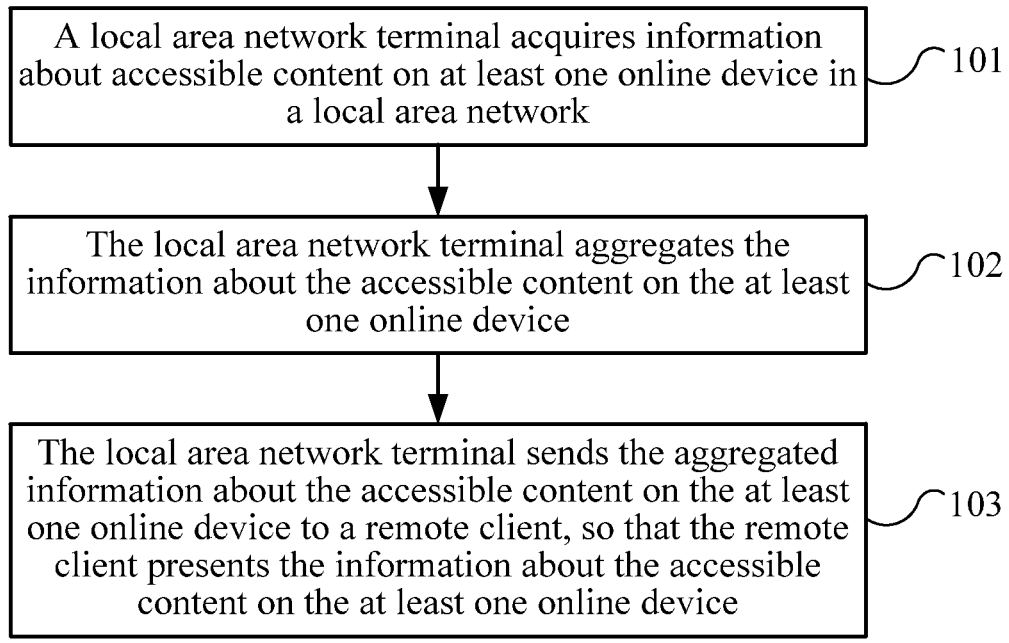
FIG. 1 is a flowchart of a remote access method according to an embodiment of the present invention.

FIG. 1 is a flowchart of a remote access method according to an embodiment of the present invention. The method shown in FIG. 1 is executed by a local area network terminal.

101. A local area network terminal acquires information about accessible content on at least one online device in a local area network.

102. The local area network terminal aggregates the information about the accessible content on the at least one online device.

103. The local area network terminal sends the aggregated information about the accessible content on the at least one online device to a remote client, so that the remote client presents the information about the accessible content on the at least one online device.

In this embodiment of the present invention, a local area network terminal sends information about accessible content on at least one online device in a local area network to a remote client, so that the remote client can present the information about the accessible content on the online device in the local area network. Therefore, the remote client does not need to acquire address information of each online device in the local area network to separately access each online device to acquire information about accessible content on the online device. In this way, the remote client can perform remote access in a simpler and more convenient manner.

Optionally, as an embodiment, the accessible content on the online device may be media content, and information about the media content may include at least one of the following: a name, a size, creation time, update time, a device where the content is located, a path, and the like. For example, the media content is a song, and the information about the media content may be, for example, a name or a singer of the song or an Identification (ID) of a device where the song is located. In addition to accessing media content on a device in a local area network (a home network is an example of the local area network), the remote client may further perform remote control, for example, remote video monitoring, on a device (for example, smart household) in the local area network. It should be understood that, the accessible content on the online device and the information about the content are not limited in this embodiment of the present invention.

Optionally, as another embodiment, before step 101, the local area network terminal may query service statuses of devices in the local area network, and determine, among the devices in the local area network, the at least one online device whose service status is online.

Optionally, as another embodiment, in step 102, the information about the accessible content on the online device is aggregated to generate a content information table; and the content information table is sent to the remote client. For example, each device in a home network is scanned to find available devices (that is, online devices) in the home network, and the online devices are D1 and D2. Information about media content on the online device D1 is name N1, size S1, path R1, creation time C1, and update time U1; information about media content C2 on the online device D1 is name N2, size S2, path R2, creation time C1, and update time U1; and information about media content C3 on the online device D2 is name N3, size S3, path R3, creation time C1, and update time U1. After information about accessible content on the foregoing online devices is acquired, a content information table is generated and may be schematically expressed as follows:

| Content Information Table | | | | | |
|---|---|---|---|---|---|
| Creation time | Update time | Name | Size | Identification of a device where the content is located | Path |
| C1 | U1 | N1 | S1 | D1 | R1 |
| C2 | U2 | N2 | S2 | D1 | R2 |
| C3 | U3 | N3 | S3 | D2 | R3 |

The remote client may access the local area network terminal to acquire information about accessible content on each online device in the local area network and browse the foregoing content information table to select information about content that is requested to be accessed. For example, the remote client requests to access the content on the device D1, and the name of the content is N1. Therefore, a user may browse the information that is about the accessible content on the online devices in the local area network and is presented by the remote client, to directly select the information about the content that is requested to be accessed.

It should be understood that, in the foregoing example, the number of online devices and the information about the accessible content on the online devices are only exemplary but not intended to limit the present invention.

Optionally, as another embodiment, the local area network terminal may receive an IP address and a port that are reported by a media server of the at least one online device, and maintain a heartbeat connection to the media server of the at least one online device. It should be understood that, a sequence of this step is not limited in this embodiment of the present invention.

For example, a service status of the device D1 in the local area network is online, a type of the device D1 is T1, an IP address of the device D1 is Address1, and a port of the device D1 is P1; a service status of the D2 device in the local area network is online, a type of the device D2 is T2, an IP address of the device D2 is Address2, and a port of the device D2 is P2; and a service status of a device D3 in the local area network is offline. A device status table may be set on the local area network terminal and is schematically expressed as follows:

| Device Status Table | | | | |
|---|---|---|---|---|
| Identification of a device | Type | IP address | Port | Service status |
| D1 | T1 | Address1 | P1 | 1 |
| D2 | T2 | Address2 | P2 | 1 |
| D3 | — | — | — | 0 |

Preferably, after a media server of an online device is started, the media server of the online device is registered with the local area network terminal, that is, information such as an IP address and a port or a service status is reported, and the local area network terminal maintains a heartbeat connection to the media server of the online device. When the service status of the online device changes or the information about the accessible content on the online device changes, the local area network terminal may update the device status table and the content information table. For example, when the content (where the name of the content is N1) on the device D1 cannot be accessed by the remote client, the local area network terminal may delete this row of information from the content information table. For another example, a device D4 in the local area network is started, and a service status changes from offline "0" to online "1", the local area network terminal may receive device information (including an IP address, a port, and the like) sent by the device D4, and add the information about the device D4 to the device status table. Further, the local area network terminal may further acquire information about content on the device D4 and update the content information table. For still another example, the service service status of the device D2 changes from online "1" to offline "0", the local area network terminal may set the information about the device D2 in the device status table or delete the information about the device D2 from the device status table, and further, the information about the content on the device D2 may further be deleted from the content information table.

It should be understood that, the foregoing example is only exemplary but not intended to limit the present invention.

In addition, the local area network terminal may regularly (periodically) update the device status table and the content information table. Alternatively, the local area network terminal may query, according to a query request sent by the remote client, whether a status of a device in the local area network and a parameter of content on an online device change; and if a change occurs, the local area network terminal may update the device status table and the content information table, and send changed information about accessible content on the online device to the remote client.

In this way, when information about accessible content on an online device changes, the local area network terminal may send changed information about the accessible content on the online device to the remote client, so that the remote client learns the changed information about the accessible content on the online device in the local area network in time.

Optionally, as another embodiment, before step 103, that is, before a connection is established between the local area network terminal and the remote client, the local area network terminal may send a first remote connection message to a public network server, where the first remote connection message carries a public network address and a port of the local area network terminal, so that the public network server sends the public network address and the port of the local area network terminal to the remote network client. The local area network terminal receives a first remote access request message sent by the remote client. In an implementation manner, the local area network terminal may send, to the remote client according to the first remote access request message, the information about the accessible content on the online device acquired in step 102. In another implementation manner, the local area network terminal may execute step 101 and step 102 after receiving the first remote access request message, and send, to the remote client, the information about the accessible content on the online device acquired in step 102.

By means of the foregoing solution, a user does not need to manually configure an address of a RAS on a local area network, so that a connection for remote access can be automatically established between a remote network client and a local area network terminal, thereby making remote access of the user more convenient.

Further, the local area network terminal may further carry first user information in the foregoing first remote connection message, so that the public network server searches for the corresponding local area network terminal according to the first user information and second user information that is sent by the remote network client. For example, user information may be home account information or a user identity. The public network server may authenticate the remote network client by using a user identity sent by the remote network client. In addition, the public network server may further match the user identity sent by the remote client with home account information sent by the local area network terminal (a one-to-one mapping relationship exists between a user identity and home account information) to find a public network address and a port of a local area network terminal that the remote network client expects to access.

Optionally, the public server notifies the local area network terminal that a remote client requests a remote connection (where a public network address and a port of the remote client are carried), and further, after receiving a confirmation message from the local area network terminal, the public server sends the public network address and the port of the local area network terminal to the remote client.

Therefore, this embodiment of the present invention provides double authentication of a cloud (a public network server) and a local area network, which can ensure security of remote access.

It should be understood that, the user information in the foregoing example is only exemplary and is not limited in this embodiment of the present invention.

Optionally, as another embodiment, after step 103, the local area network terminal may receive a second remote access request message sent by the remote client; acquire, according to the second remote access request message, content that the remote client requests to access from a media server of a corresponding device (that is, a device where the content that the remote client requests to access is located); and send, to the remote client, the content that the remote client requests to access.

If the media server of the corresponding device is a DMS, the local area network terminal also has an HTTP agent function, that is, the local area network terminal may initiate an HTTP request to the media server of the corresponding device; and receive the content that the remote client requests to access sent by using the HTTP protocol by the media server of the corresponding device. Further, the local area network terminal sends, to the remote client, the content that the remote client requests to access.

Therefore, a remote client does not need to acquire address information of each online device in a local area network to access content on the online device in the local area network. A device in the local area network is transparent to the remote client. In this way, the remote client can perform remote access in a simpler and more convenient manner.

This embodiment of the present invention is described in further detail in the following with reference to an example shown in FIG. 4.

Figure 2:
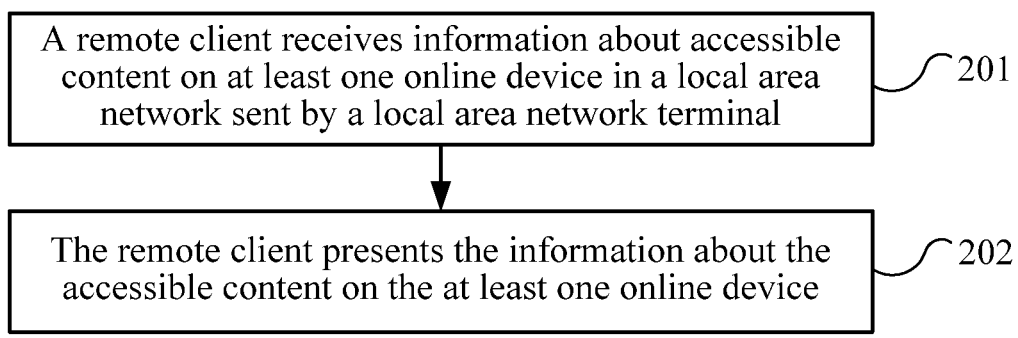
FIG. 2 is a flowchart of a remote access method according to another embodiment of the present invention.

FIG. 2 is a flowchart of a remote access method according to an embodiment of the present invention. The method shown in FIG. 2 is executed by a remote client and corresponds to the method shown in FIG. 1; therefore, a description that is repeated with that in the embodiment shown in FIG. 1 is properly omitted.

201. A remote client receives information about accessible content on at least one online device in a local area network sent by a local area network terminal.

202. The remote client presents the information about the accessible content on the at least one online device.

In this embodiment of the present invention, a remote client receives and presents information about accessible content on at least one online device in a local area network sent by a local area network terminal, so that the remote client can present the information about the accessible content on the online device in the local area network. Therefore, the remote client does not need to acquire address information of each online device in the local area network to separately access each online device to acquire information about accessible content on the online device. In this way, the remote client can perform remote access in a simpler and more convenient manner.

Optionally, as an embodiment, the accessible content on the online device may be media content, and information about the media content may include at least one of the following: a name, a size, creation time, update time, a device where the content is located, a path, and the like. In addition to accessing media content on a device in a local area network (a home network is an example of the local area network), the remote client (for example, a tablet computer (Pad), a mobile phone (Mobile) or a laptop computer (Laptop)) may further perform remote control on a device (for example, smart household) in the local area network. It should be understood that, the accessible content on the online device and the information about the content are not limited in this embodiment of the present invention.

Optionally, as another embodiment, in step 201, the remote client may receive a content information table sent by the local area network terminal. That is, a user may browse the content information table presented by the remote client, to select information about content that is requested to be accessed. An embodiment of the content information table is as described above and is no longer described herein.

In addition, the remote client may regularly (periodically) send a query request to the local area network terminal for querying, so that the local area network terminal queries, according to the query request, whether a status of a device in the local area network and a parameter of content on an online device change; and if a change occurs, the local area network terminal may update a device status table and the content information table, and send changed information about accessible content on the online device to the remote client.

Therefore, when information about accessible content on an online device in the local area network changes, the remote client may receive changed information about the accessible content on the online device sent by the local area network terminal, so as to learn the changed information about the accessible content on the online device in the local area network in time.

Optionally, as another embodiment, before step 201, that is, before a connection is established between the remote client and the local area network terminal, the remote client may send a second remote connection message to a public network server, where the second remote connection message carries a public network address and a port of the remote client; and receive a public network address and a port of the local area network terminal that are sent according to the foregoing second remote connection message by the public network server. The remote client acquires the public network address and the port of the local area network terminal, and therefore may send a first remote access request message to the local area network terminal, so that in step 201, the local area network terminal sends the information about the accessible content on the online device to the remote client according to the first remote access request message.

By means of the foregoing solution, a user does not need to manually configure an address of a RAS on a local area network, so that a connection for remote access can be automatically established between a remote network client and a local area network terminal, thereby making remote access of the user more convenient.

Further, the remote network client may further carry second user information in the second remote connection message, so that the public network server authenticates the remote client according to the second user information, or the public network server searches for the corresponding local area network terminal according to the second user information and first user information that is sent by the local area network terminal. An embodiment of the user information and a manner in which the public network server performs authentication is as described above and is no longer described herein.

Therefore, this embodiment of the present invention provides double authentication of a cloud (a public network server) and a local area network, which can ensure security of remote access.

Optionally, as another embodiment, after step 202, the remote client may send a second remote access request message to the local area network terminal, so that the local area network terminal acquires, according to the second remote access request message, content that the remote client requests to access from a media server of a corresponding device; and receive the content that the remote client requests to access sent by the local area network terminal. For example, the content information table received by the remote client has information about multiple pieces of content, which are a name of a song, a name of a movie, creation time of a photo, and the like. The remote client chooses to request to play a movie, and information about the movie, for example, a name of the movie, may be carried in the second remote access request message. After receiving the second remote access request message, the local area network terminal acquires, from a media server of a device where the movie is located, the movie requested by the remote client, and sends the movie to the remote client, so that the remote client can play the movie.

Therefore, a remote client may pay attention to only information about accessible content on an accessible online device and does not need to acquire address information of each online device in a local area network to separately access each online device to acquire information about accessible content on the online device. A device in the local area network is transparent to the remote client. In this way, the remote client can perform remote access in a simpler and more convenient manner.

It should be understood that, the content that the remote client requests to access in the foregoing embodiment is only exemplary but not intended to limit the present invention.

This embodiment of the present invention is described in further detail in the following with reference to an example shown in FIG. 4.

Figure 3:
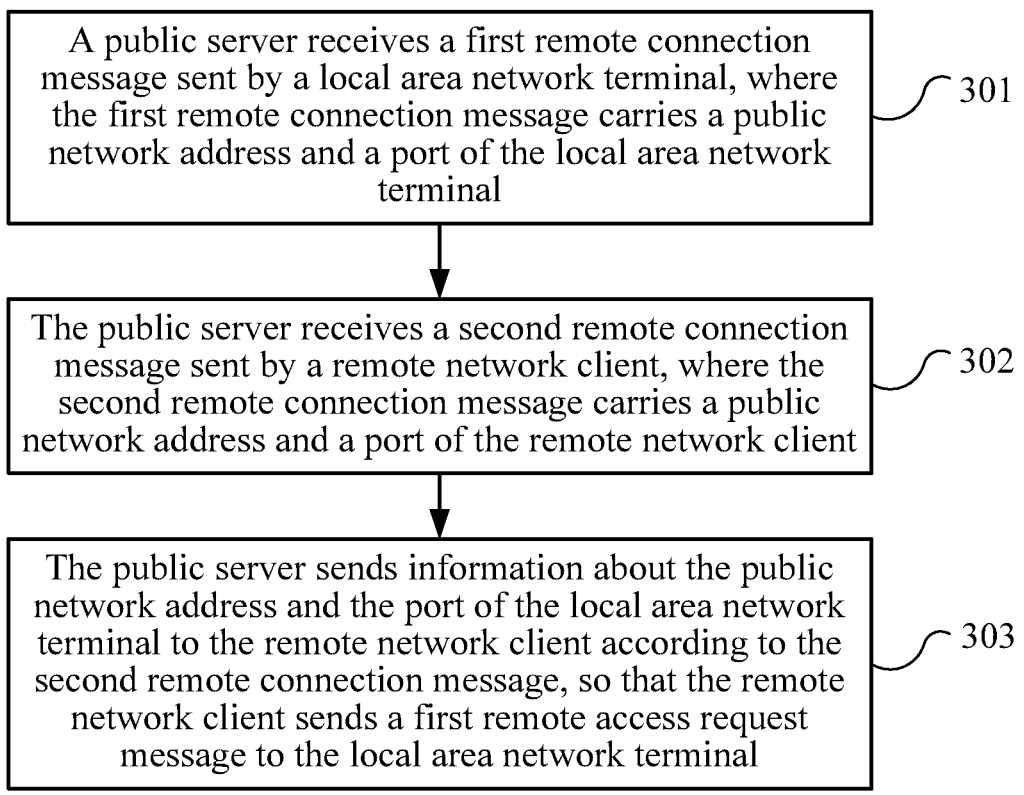
FIG. 3 is a flowchart of a remote access method according to another embodiment of the present invention.

FIG. 3 is a flowchart of a remote access method according to an embodiment of the present invention. The method shown in FIG. 3 is executed by a public server and corresponds to the methods shown in FIG. 1 and FIG. 2; therefore, a description that is repeated with that in the embodiments shown in FIG. 1 and FIG. 2 is properly omitted.

301. A public server receives a first remote connection message sent by a local area network terminal, where the first remote connection message carries a public network address and a port of the local area network terminal.

302. The public server receives a second remote connection message sent by a remote network client, where the second remote connection message carries a public network address and a port of the remote network client.

303. The public server sends information about the public network address and the port of the local area network terminal to the remote network client according to the second remote connection message, so that the remote network client sends a first remote access request message to the local area network terminal.

By means of the foregoing solution, a user does not need to manually configure an address of a RAS on a local area network, and a remote client acquires a public network address and a port of a local area network terminal from a public network server, so that a connection for remote access can be automatically established between the remote network client and the local area network terminal, thereby making remote access of the user more convenient.

Optionally, as an embodiment, in step 302, the remote client may further carry second user information in the second remote connection message, and after step 302, the public network server may authenticate the remote network client according to the second user information.

Optionally, as another embodiment, before step 303, the public server may send the second user information to the local area network terminal, so that the local area network terminal authenticates the remote network client according to the second user information; and after authentication for the local area network terminal succeeds, the public server receives confirmation information sent by the local area network terminal.

Optionally, as another embodiment, in step 301, the local area network terminal may further carry first user information in the first remote connection message, and after step 302, the public server searches for the corresponding local area network terminal according to the first user information and the second user information that is sent by the remote client.

For example, user information may be home account information or a user identity. The public network server may authenticate the remote network client by using a user identity sent by the remote network client. In addition, the public network server may further match the user identity sent by the remote network client with a user identity sent by the local area network terminal to find a public network address and a port of a local area network terminal that the remote network client expects to access. Optionally, the public server notifies the local area network terminal that a remote client requests a remote connection (where a public network address and a port of the remote client are carried), and further, after receiving a confirmation message from the local area network terminal, the public server sends the public network address and the port of the local area network terminal to the remote client.

Therefore, this embodiment of the present invention provides double authentication of a cloud (a public network server) and a local area network, which can ensure security of remote access.

It should be understood that, the user information in the foregoing example is only exemplary and is not limited in this embodiment of the present invention.

This embodiment of the present invention is described in further detail in the following with reference to an example shown in FIG. 4.

Figure 4:
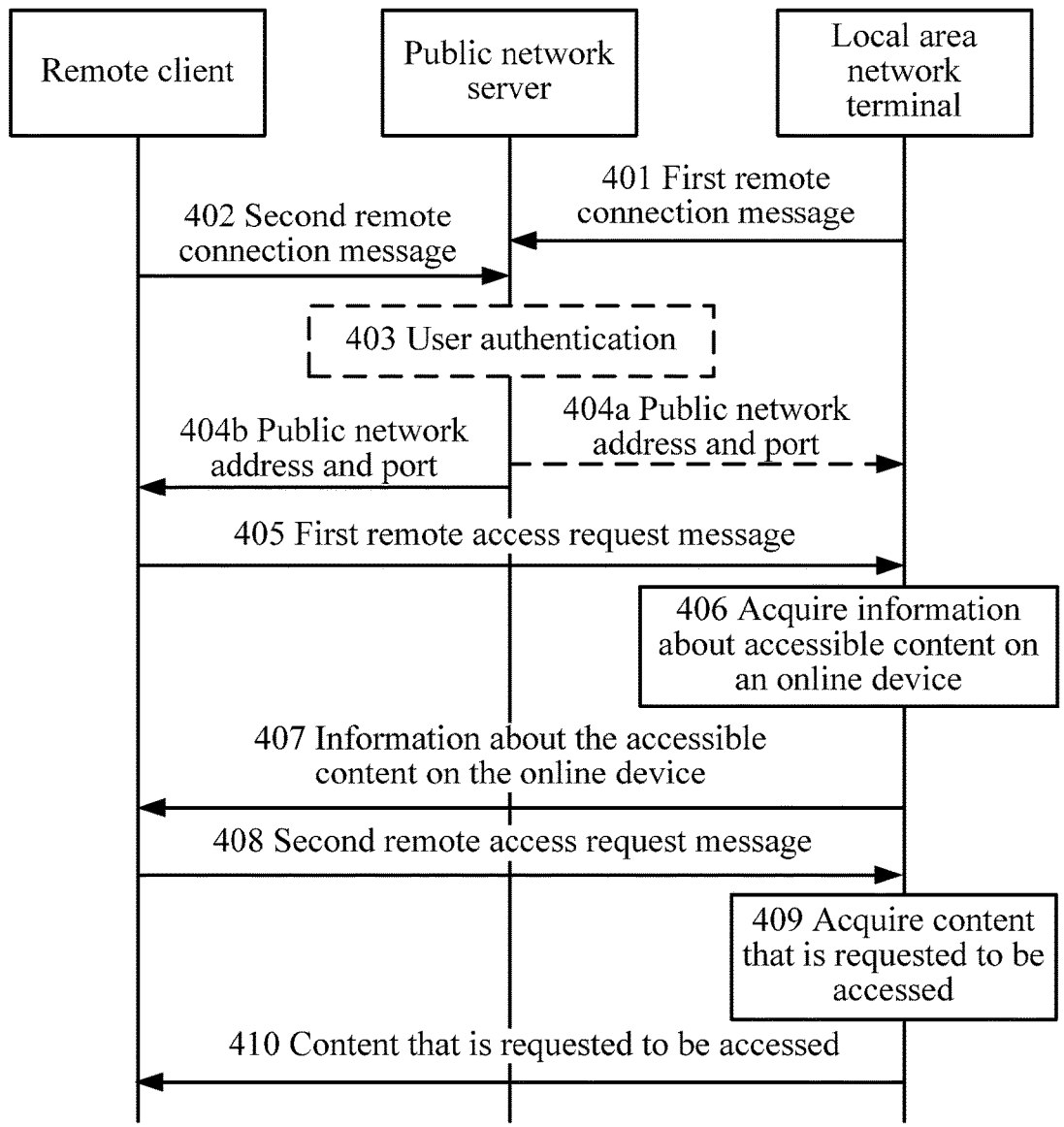
FIG. 4 is a schematic flowchart of a process of a remote access method according to an embodiment of the present invention.

FIG. 4 is a schematic flowchart of a process of a remote access method according to an embodiment of the present invention.

401. A public server receives a first remote connection message sent by a local area network terminal.

The local area network terminal actively connects to a server on the Internet, that is, sends the first remote connection message to the public network server, where the first remote connection message carries a public network address and a port of the local area network terminal. Optionally, the local area network terminal may further carry first user information in the first remote connection message. For example, the first user information is home account information.

402. The public server receives a second remote connection message sent by a remote client.

When the remote client needs to perform remote access, the remote client first establishes a connection to the local area network terminal, and sends the second remote connection message to the public server, where the second remote connection message carries a public network address and a port of the remote client. Optionally, the remote client may further carry second user information in the second remote connection message. For example, the second user information is a user identity.

403. The public server performs user authentication.

404*a*. The public server sends a public network address and a port of the remote client to the local area network terminal.

For example, the public network server may authenticate the remote network client according to a user identity sent by the remote network client. In addition, the public network server may further match the user identity sent by the remote network client with home account information sent by the local area network terminal. For example, a mapping relationship between home account information and a user identity is set on the public server in advance; or the first user information carries a user identity, and if the first user information and the second user information are consistent, authentication for the remote client succeeds, and the public server may send an authentication reply message to the remote client. Meanwhile, the public server may find, according to a mapping relationship between the first user information and the second user information, a public network address and a port of a local area network terminal that the remote network client expects to access.

Optionally, the public server may execute step 404*a* to notify the local area network terminal that a remote client requests a remote connection (where a public network address and a port of the remote client and the second user information are carried); further, after receiving a confirmation message from the local area network terminal, the public server extracts, based on an IP header, the public network address and the port of the local area network terminal.

Therefore, this embodiment of the present invention provides double authentication of a cloud (a public network server) and a local area network, which can ensure security of remote access.

It should be understood that, the user information in the foregoing example is only exemplary and is not limited in this embodiment of the present invention.

It should further be noted that, in FIG. 4, only one local area network terminal and one remote client are described. It should be understood that this is not limited in this embodiment of the present invention, and the public server may interact with multiple local area network terminals and multiple remote clients.

404*b*. The public server sends a public network address and a port of the local area network terminal to the remote client.

Therefore, a user does not need to manually configure an address of a RAS on a local area network, so that a connection for remote access can be automatically established between a remote network client and a local area network terminal, thereby making remote access of the user more convenient.

405. The remote client sends a first remote access request message to the local area network terminal.

The remote client sends, according to the public network address and the port of the local area network terminal that are received in step 404*b*, the first remote access request message to the local area network terminal, so as to acquire information about accessible content in a local area network.

406. The local area network terminal acquires information about accessible content on an online device in a local area network.

407. The local area network terminal sends the information about the accessible content on the online device to the remote client.

For example, the local area network terminal may query service statuses of devices in the local area network according to the first remote access request message received in step 405; for example, the local area network terminal finds an online device in a device status table, extracts, from a content information table, information about content located on an online device, and sends the information about the content located on the online device to the remote client; or a content information table generated by the local area network terminal may be a content information table about an online device, and in this case, the local area network terminal may send the content information table to the remote client. An embodiment of the device status table and the content information table may be as described above and is no longer described herein.

In addition, the local area network terminal may further update the device status table or the content information table, and an embodiment of update is as described above and is no longer described herein. It should be understood that, in this embodiment of the present invention, a sequence of a process in which the local area network terminal updates the device status table or content information is not limited; update may be performed before a connection to the remote client is established, or performed periodically, or the device status table or content information may be updated after a query request sent by the remote client is received.

In this way, when information about accessible content on an online device changes, the local area network terminal may send changed information about the accessible content on the online device to the remote client, so that the remote client learns the changed information about the accessible content on the online device in the local area network in time.

408. The remote client sends a second remote access request message to the local area network terminal.

The remote client selects information about content that the remote client needs to access from the information about the accessible content on the online device received in step 407. For example, the information about the accessible content on the online device includes information about media content, which includes a name of a song, a name of a movie, and creation time of a photo. The remote client chooses to request to play a song, and may carry information about the song, for example, a name of the song, in the second remote access request message.

Optionally, the information about the accessible content on the online device may include information about smart household, and the remote client selects information about smart household to be controlled and carries the information in the second remote access request message, so as to implement control on the smart household.

It should be understood that, the foregoing example is only exemplary but not intended to limit the present invention.

409. The local area network terminal acquires content that the remote client requests to access.

For example, the local area network terminal carries information about a song, for example, a name of a song, in the second remote access request message received in step 408. The local area network terminal acquires the song from a device where the song is located.

If a media server of the device where the song is located is a DMS, the local area network terminal further has an HTTP agent function, that is, the local area network terminal may initiate an HTTP request to the media server of the device where the song is located; and receive the song sent by using the HTTP protocol by the media server of the device where the song is located.

410. The local area network terminal sends, to the remote client, the content that the remote client requests to access.

For example, the local area network terminal sends the song acquired in step 409 to the remote client, and the remote client can play the song.

It should be understood that, the foregoing example of the content that the remote client requests to access is only exemplary but not intended to limit this embodiment of the present invention.

Therefore, a remote client may browse information that is about accessible content on an online device in a local area network and is presented by the remote client, to select information about content that is requested to be accessed. Therefore, the remote client does not need to acquire address information of each online device in the local area network to separately access each online device to acquire information about accessible content on the online device. In this way, the remote client can perform remote access in a simpler and more convenient manner.

Figure 5:
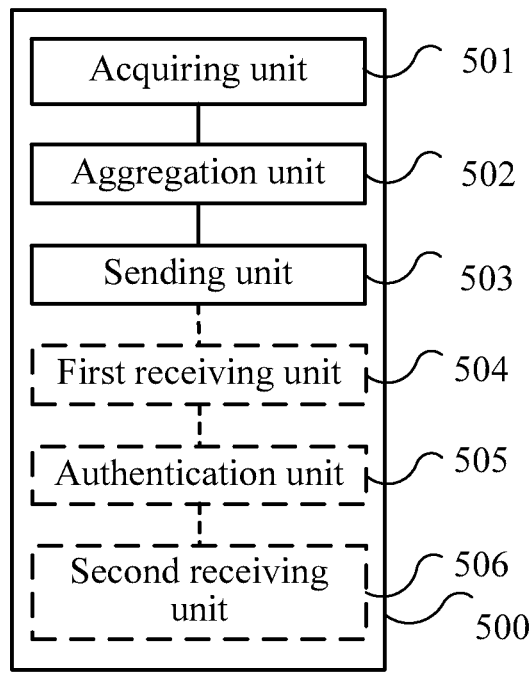
FIG. 5 is a structural block diagram of a local area network terminal according to an embodiment of the present invention.

FIG. 5 is a structural block diagram of a local area network terminal according to an embodiment of the present invention. A home network is an example of the local area network. A local area network terminal 500 shown in FIG. 5 includes an acquiring unit 501, an aggregation unit 502, and a sending unit 503.

The acquiring unit 501 is configured to acquire information about accessible content on at least one online device in a local area network.

The aggregation unit 502 is configured to aggregate the information about the accessible content on the at least one online device acquired by the acquiring unit 501.

The sending unit 503 is configured to send, to a remote client, the information about the accessible content on the at least one online device aggregated by the aggregation unit 502, so that the remote client presents the information about the accessible content on the at least one online device.

In this embodiment of the present invention, a local area network terminal sends information about accessible content on at least one online device in a local area network to a remote client, so that the remote client can present the information about the accessible content on the online device in the local area network. Therefore, the remote client does not need to acquire address information of each online device in the local area network to separately access each online device to acquire information about accessible content on the online device. In this way, the remote client can perform remote access in a simpler and more convenient manner.

The local area network terminal 500 can implement operations related to the local area network terminal in the embodiments shown in FIG. 1 to FIG. 4, and therefore, detailed description is no longer provided to avoid repetition.

Optionally, as an embodiment, the acquiring unit 501 is further configured to query service statuses of devices in the local area network, and determine, among the devices in the local area network, the at least one online device whose service status is online.

Optionally, as another embodiment, the aggregation unit 502 is further configured to aggregate the information about the accessible content on the online device to generate a content information table. The sending unit 503 is configured to send the content information table to the remote client. Therefore, a user may browse the information that is about the accessible content on the online device in the local area network and is presented by the remote client, to directly select information about content that is requested to be accessed.

Optionally, as another embodiment, the sending unit 503 is further configured to send a first remote connection message to a public network server, where the first remote connection message carries a public network address and a port of the local area network terminal, so that the public network server sends the public network address and the port of the local area network terminal to the remote network client. The local area network terminal 500 further includes a first receiving unit 504, where the first receiving unit 504 is configured to receive a first remote access request message sent by the remote client. The sending unit 503 is configured to send the aggregated information about the accessible content on the at least one online device to the remote client according to the first remote access request message.

Therefore, in this embodiment of the present invention, a user does not need to manually configure an address of a RAS on a local area network, so that a connection for remote access can be automatically established between a remote network client and a local area network terminal, thereby making remote access of the user more convenient.

Further, the first receiving unit 504 is further configured to receive second user information sent by the public network server. The local area network terminal 500 further includes an authentication unit 505, where the authentication unit 505 is configured to authenticate the remote network client according to the second user information. The sending unit 503 is further configured to send confirmation information to the public network server.

Therefore, this embodiment of the present invention provides double authentication of a cloud (a public network server) and a local area network, which can ensure security of remote access.

Optionally, as another embodiment, the local area network terminal 500 may further include a second receiving unit, where the second receiving unit 506 is configured to receive a second remote access request message sent by the remote client, where the second remote access request message carries information about content that the remote client requests to access, where the information is selected by the remote client from the information about the accessible content on the at least one online device. The acquiring unit 501 is further configured to acquire, according to the second remote access request message, the content that the remote client requests to access from a media server of a corresponding device. The sending unit 503 is further configured to send, to the remote client, the content that the remote client requests to access.

Further, the sending unit 503 is further configured to: if the media server of the corresponding device is a DMS, initiate an HTTP request to the media server of the corresponding device. The second receiving unit 506 is configured to receive the content that the remote client requests to access sent by using the HTTP protocol by the media server of the corresponding device.

Optionally, as another embodiment, the acquiring unit 501 is further configured to receive an IP address and a port that are reported by a media server of the at least one online device, and maintain a heartbeat connection to the media server of the at least one online device.

In this way, when information about accessible content on an online device changes, the local area network terminal may send changed information about the accessible content on the online device to the remote client, so that the remote client learns the changed information about the accessible content on the online device in the local area network in time.

Figure 6:
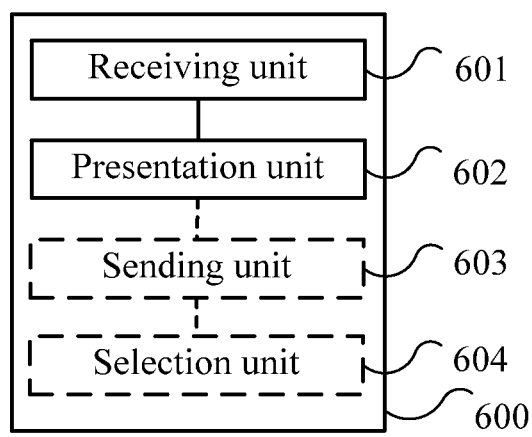
FIG. 6 is a structural block diagram of a remote client according to an embodiment of the present invention.

FIG. 6 is a structural block diagram of a remote client according to an embodiment of the present invention. A remote client 600 includes a receiving unit 601 and a presentation unit 602. The remote client is, for example, a Pad, a Mobile or a Laptop.

The receiving unit 601 is configured to receive information about accessible content on at least one online device in a local area network sent by a local area network terminal.

The presentation unit 602 is configured to present the information about the accessible content on the at least one online device received by the receiving unit 601.

In this embodiment of the present invention, a remote client receives and presents information about accessible content on at least one online device in a local area network sent by a local area network terminal, so that the remote client can present the information about the accessible content on the online device in the local area network. Therefore, the remote client does not need to acquire address information of each online device in the local area network to separately access each online device to acquire information about accessible content on the online device. In this way, the remote client can perform remote access in a simpler and more convenient manner.

The remote client 600 can implement operations related to the remote client in the embodiments shown in FIG. 1 to FIG. 4, and therefore, detailed description is no longer provided to avoid repetition.

Optionally, as an embodiment, the remote client 600 further includes a sending unit 603, where the sending unit 603 is configured to send a second remote connection message to a public network server, where the second remote connection message carries a public network address and a port of the remote client. The receiving unit 601 is further configured to receive a public network address and a port of the local area network terminal that are sent according to the second remote connection message by the public network server. The sending unit 603 is further configured to send a first remote access request message to the local area network terminal, so that the local area network terminal sends the information about the accessible content on the at least one online device to the remote client according to the first remote access request message.

Therefore, in this embodiment of the present invention, a user does not need to manually configure an address of a RAS on a local area network, so that a connection for remote access can be automatically established between a remote network client and a local area network terminal, thereby making remote access of the user more convenient.

Optionally, as an embodiment, the remote client 600 further includes a selection unit 604, where the selection unit 604 is configured to select, from the information about the accessible content on the at least one online device, information about content that the remote client requests to access. The sending unit 603 is further configured to send a second remote access request message to the local area network terminal, where the second remote access request message carries the information about the content that the remote client requests to access. The receiving unit 601 is further configured to receive the content that the remote client requests to access sent by the local area network terminal.

Therefore, a remote client may pay attention to only information about accessible content on an accessible online device and does not need to acquire address information of each online device in a local area network to separately access each online device to acquire information about accessible content on the online device. A device in the local area network is transparent to the remote client. In this way, the remote client can perform remote access in a simpler and more convenient manner.

Figure 7:
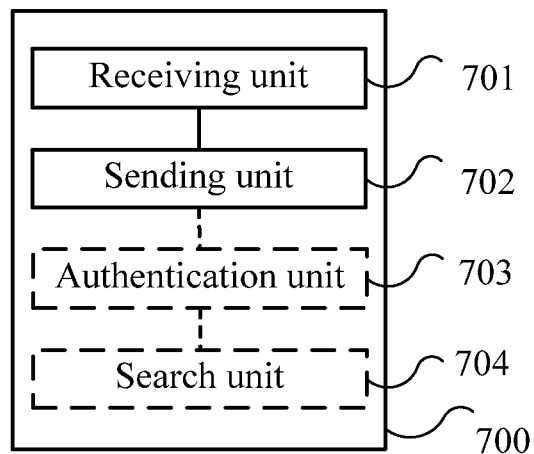
FIG. 7 is a structural block diagram of a public network server according to an embodiment of the present invention.

FIG. 7 is a structural block diagram of a public network server according to an embodiment of the present invention. A public network server 700 includes a receiving unit 701 and a sending unit 702.

The receiving unit 701 is configured to receive a first remote connection message sent by a local area network terminal, where the first remote connection message carries a public network address and a port of the local area network terminal.

The receiving unit 701 is further configured to receive a second remote connection message sent by a remote network client, where the second remote connection message carries a public network address and a port of the remote network client.

The sending unit 702 is configured to send, to the remote network client according to the second remote connection message received by the receiving unit 701, information about the public network address and the port of the local area network terminal received by the receiving unit, so that the remote network client sends a first remote access request message to the local area network terminal.

By means of the foregoing solution, a user does not need to manually configure an address of a RAS on a local area network, and a remote client acquires a public network address and a port of a local area network terminal from a public network server, so that a connection for remote access can be automatically established between the remote network client and the local area network terminal, thereby making remote access of the user more convenient.

The public network server 700 can implement operations related to the public network server in the embodiments shown in FIG. 1 to FIG. 4, and therefore, detailed description is no longer provided to avoid repetition.

Optionally, as an embodiment, the second remote connection message further carries second user information, and the public network server further includes an authentication unit 703. The authentication unit 703 is configured to authenticate the remote network client according to the second user information.

Further, the sending unit 702 is further configured to send the second user information to the local area network terminal, so that the local area network terminal authenticates the remote network client according to the second user information. The receiving unit 701 is further configured to receive confirmation information that is sent according to the second user information by the local area network terminal.

Optionally, as another embodiment, the first remote connection message further carries first user information, and the public network server further include a search unit 704. The search unit 704 is configured to search for the corresponding local area network terminal according to the first user information and the second user information.

Therefore, this embodiment of the present invention provides double authentication of a cloud (a public network server) and a local area network, which can ensure security of remote access.

Figure 8:
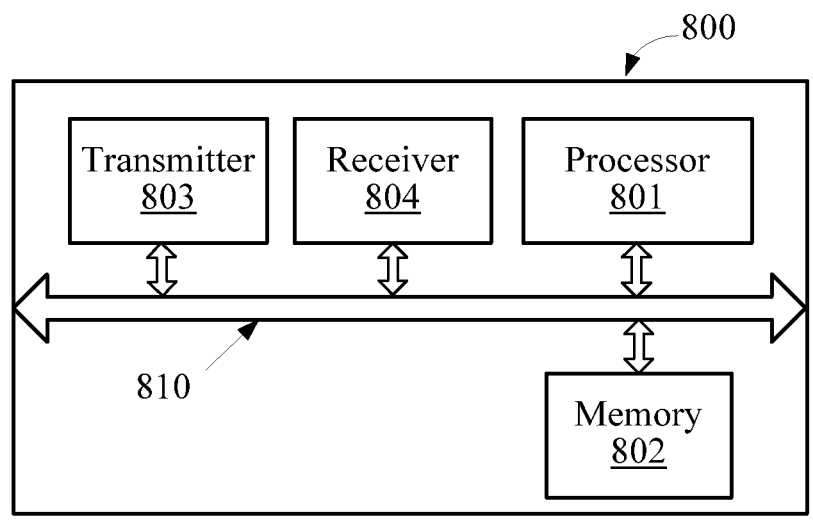
FIG. 8 is a block diagram of a device according to an embodiment of the present invention.

An embodiment of the present invention further provides an apparatus embodiment for implementing the steps and methods in the foregoing method embodiments. FIG. 8 shows an embodiment of a device. In this embodiment, a device 800 includes a processor 801, a memory 802, a transmitter 803, and a receiver 804. The processor 801 controls an operation of the device 800, and the processor 801 may also be referred to as a Central Processing Unit (CPU). The memory 802 may include a read-only memory and a random access memory, and provides an instruction and data for the processor 801. A part of the memory 802 may further include a nonvolatile random access memory (NVRAM). The processor 801, the memory 802, the transmitter 803, and the receiver 804 are coupled by using a bus system 810, where the bus system 810 further includes, in addition to a data bus, a power supply bus, a control bus, and a status signal bus. However, for clear description, various buses are all marked as the bus system 810 in the figure.

The foregoing device 800 is applicable to the methods disclosed in the foregoing embodiments of the present invention. The processor 801 may be an integrated circuit chip and has a signal processing capability. During implementation, the steps in the foregoing methods may be accomplished by a hardware-integrated logic circuit or a software-form instruction in the processor 801.

Figure 9:
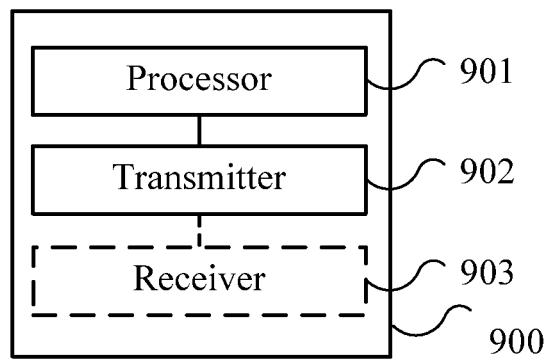
FIG. 9 is a structural block diagram of a local area network terminal according to an embodiment of the present invention.

FIG. 9 is a structural block diagram of a local area network terminal according to an embodiment of the present invention. A home network is an example of the local area network. A local area network terminal 900 shown in FIG. 9 includes a processor 901 and a transmitter 902.

The processor 901 is configured to acquire information about accessible content on at least one online device in a local area network.

The processor 901 is further configured to aggregate the acquired information about the accessible content on the at least one online device.

The transmitter 902 is configured to send, to a remote client, the information about the accessible content on the at least one online device aggregated by the processor 901, so that the remote client presents the information about the accessible content on the at least one online device.

In this embodiment of the present invention, a local area network terminal sends information about accessible content on at least one online device in a local area network to a remote client, so that the remote client can present the information about the accessible content on the online device in the local area network. Therefore, the remote client does not need to acquire address information of each online device in the local area network to separately access each online device to acquire information about accessible content on the online device. In this way, the remote client can perform remote access in a simpler and more convenient manner.

The local area network terminal 900 can implement operations related to the local area network terminal in the embodiments shown in FIG. 1 to FIG. 4, and therefore, detailed description is no longer provided to avoid repetition.

Optionally, as an embodiment, the processor 901 is further configured to query service statuses of devices in the local area network, and determine, among the devices in the local area network, the at least one online device whose service status is online.

Optionally, as another embodiment, the processor 901 is further configured to aggregate the information about the accessible content on the online device to generate a content information table. The transmitter 902 is configured to send the content information table to the remote client. Therefore, a user may browse the information that is about the accessible content on the online device in the local area network and is presented by the remote client, to directly select information about content that is requested to be accessed.

Optionally, as another embodiment, the transmitter 902 is further configured to send a first remote connection message to a public network server, where the first remote connection message carries a public network address and a port of the local area network terminal, so that the public network server sends the public network address and the port of the local area network terminal to the remote network client. The local area network terminal 900 further includes a receiver 903, where the receiver 903 is configured to receive a first remote access request message sent by the remote client. The transmitter 902 is configured to send the aggregated information about the accessible content on the at least one online device to the remote client according to the first remote access request message.

Therefore, in this embodiment of the present invention, a user does not need to manually configure an address of a RAS on a local area network, so that a connection for remote access can be automatically established between a remote network client and a local area network terminal, thereby making remote access of the user more convenient.

Further, the receiver 903 is further configured to receive second user information sent by the public network server. The processor 901 is further configured to authenticate the remote network client according to the second user information. The transmitter 902 is further configured to send confirmation information to the public network server.

Therefore, this embodiment of the present invention provides double authentication of a cloud (a public network server) and a local area network, which can ensure security of remote access.

Optionally, as another embodiment, the receiver 903 is further configured to receive a second remote access request message sent by the remote client, where the second remote access request message carries information about content that the remote client requests to access, where the information is selected by the remote client from the information about the accessible content on the at least one online device. The processor 901 is further configured to acquire, according to the second remote access request message, the content that the remote client requests to access from a media server of a corresponding device. The transmitter 902 is further configured to send, to the remote client, the content that the remote client requests to access.

Further, the transmitter 902 is further configured to: if the media server of the corresponding device is a DMS, initiate an HTTP request to the media server of the corresponding device. The receiver 903 is configured to receive the content that the remote client requests to access sent by using the HTTP protocol by the media server of the corresponding device.

Optionally, as another embodiment, the processor 901 is further configured to receive an IP address and a port that are reported by a media server of the at least one online device, and maintain a heartbeat connection to the media server of the at least one online device.

In this way, when information about accessible content on an online device changes, the local area network terminal may send changed information about the accessible content on the online device to the remote client, so that the remote client learns the changed information about the accessible content on the online device in the local area network in time.

Figure 10:
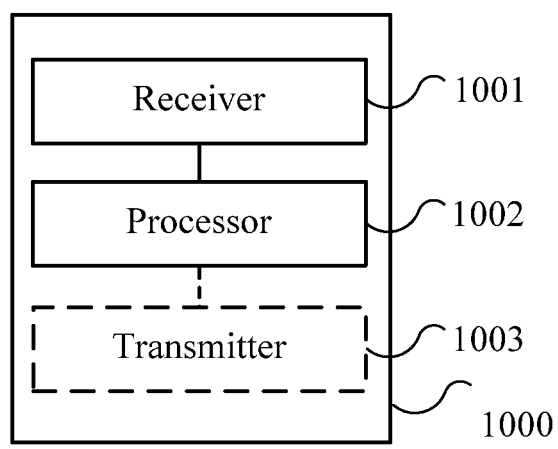
FIG. 10 is a structural block diagram of a remote client according to an embodiment of the present invention.

FIG. 10 is a structural block diagram of a remote client according to an embodiment of the present invention. A remote client 1000 includes a receiver 1001 and a processor 1002. The remote client is, for example, a Pad, a Mobile or a Laptop.

The receiver 1001 is configured to receive information about accessible content on at least one online device in a local area network sent by a local area network terminal.

The processor 1002 is configured to present the information about the accessible content on the at least one online device received by the receiver 1001.

In this embodiment of the present invention, a remote client receives and presents information about accessible content on at least one online device in a local area network sent by a local area network terminal, so that the remote client can present the information about the accessible content on the online device in the local area network. Therefore, the remote client does not need to acquire address information of each online device in the local area network to separately access each online device to acquire information about accessible content on the online device. In this way, the remote client can perform remote access in a simpler and more convenient manner.

The remote client 1000 can implement operations related to the remote client in the embodiments shown in FIG. 1 to FIG. 4, and therefore, detailed description is no longer provided to avoid repetition.

Optionally, as an embodiment, the remote client 1000 further includes a transmitter 1003, where the transmitter 1003 is configured to send a second remote connection message to a public network server, where the second remote connection message carries a public network address and a port of the remote client. The receiver 1001 is further configured to receive a public network address and a port of the local area network terminal that are sent according to the second remote connection message by the public network server. The transmitter 1003 is further configured to send a first remote access request message to the local area network terminal, so that the local area network terminal sends information about the accessible content on the at least one online device to the remote client according to the first remote access request message.

Therefore, in this embodiment of the present invention, a user does not need to manually configure an address of a RAS on a local area network, so that a connection for remote access can be automatically established between a remote network client and a local area network terminal, thereby making remote access of the user more convenient.

Optionally, as an embodiment, the processor 1002 is configured to select, from the information about the accessible content on the at least one online device, information about content that the remote client requests to access. The transmitter 1003 is further configured to send a second remote access request message to the local area network terminal, where the second remote access request message carries the information about the content that the remote client requests to access. The receiver 1001 is further configured to receive the content that the remote client requests to access sent by the local area network terminal.

Therefore, a remote client may pay attention to only information about accessible content on an accessible online device and does not need to acquire address information of each online device in a local area network to separately access each online device to acquire information about accessible content on the online device. A device in the local area network is transparent to the remote client. In this way, the remote client can perform remote access in a simpler and more convenient manner.

Figure 11:
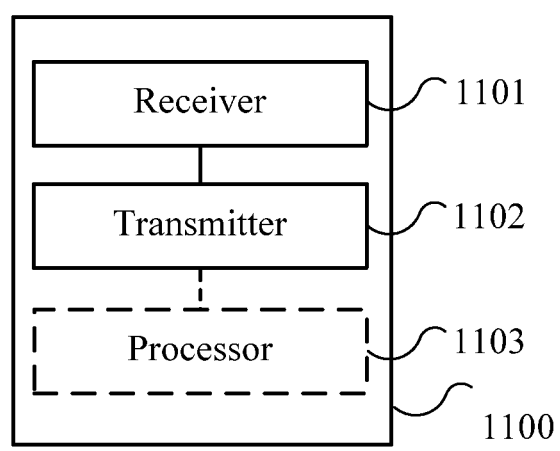
FIG. 11 is a structural block diagram of a public network server according to an embodiment of the present invention.

FIG. 11 is a structural block diagram of a public network server according to an embodiment of the present invention. A public network server 1100 includes a receiver 1101 and a transmitter 1102.

The receiver 1101 is configured to receive a first remote connection message sent by a local area network terminal, where the first remote connection message carries a public network address and a port of the local area network terminal.

The receiver 1101 is further configured to receive a second remote connection message sent by a remote network client, where the second remote connection message carries a public network address and a port of the remote network client.

The transmitter 1102 is configured to send, to the remote network client according to the second remote connection message received by the receiver 1101, information about the public network address and the port of the local area network terminal received by a receiving unit, so that the remote network client sends a first remote access request message to the local area network terminal.

By means of the foregoing solution, a user does not need to manually configure an address of a RAS on a local area network, and a remote client acquires a public network address and a port of a local area network terminal from a public network server, so that a connection for remote access can be automatically established between the remote network client and the local area network terminal, thereby making remote access of the user more convenient.

The public network server 1100 can implement operations related to the public network server in the embodiments shown in FIG. 1 to FIG. 4, and therefore, detailed description is no longer provided to avoid repetition.

Optionally, as an embodiment, the second remote connection message further carries second user information, and the public network server further includes a processor 1103. The processor 1103 is configured to authenticate the remote network client according to the second user information.

Further, the transmitter 1102 is further configured to send the second user information to the local area network terminal, so that the local area network terminal authenticates the remote network client according to the second user information. The receiving unit 701 is further configured to receive confirmation information that is sent according to the second user information by the local area network terminal.

Optionally, as another embodiment, the first remote connection message further carries first user information, and the processor 1103 is further configured to search for the corresponding local area network terminal according to the first user information and the second user information.

Therefore, this embodiment of the present invention provides double authentication of a cloud (a public network server) and a local area network, which can ensure security of remote access.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division or may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in the form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

What is claimed is:

1. A remote access method, comprising:

acquiring, by a local area network terminal, information about accessible content on at least one online device in a local area network;

aggregating, by the local area network terminal, the information about the accessible content on the at least one online device; and sending, by the local area network terminal, the aggregated information about the accessible content on the at least one online device to a remote client, the aggregated information comprising a content information table and a device status table, the content information table comprising a location device and a path for the accessible content on the at least one online device, and the device status table comprising a device identification, an Internet Protocol (IP) address, and a service status for online devices in the local area network, before sending, by the local area network terminal, the aggregated information about the accessible content on the at least one online device to the remote client, the method further comprising:

sending, by the local area network terminal, a first remote connection message to a public network server, the first remote connection message carrying a public network address and a port of the local area network terminal such that the public network server sends the public network address and the port of the local area network terminal to the remote network client; and receiving, by the local area network terminal, a first remote access request message from the remote client, the local area network terminal sending the aggregated information about the accessible content on the at least one online device to a remote client comprising sending, by the local area network terminal, the aggregated information about the accessible content on the at least one online device to the remote client according to the first remote access request message, and the first remote connection message further carrying first user information such that the public network server searches for the corresponding local area network terminal according to second user information from the remote network client and the first user information, and after sending, by the local area network terminal, the first remote connection message to the public network server, the method further comprising:
  receiving, by the local area network terminal, second user information from the public network server;
  authenticating, by the local area network terminal, the remote network client according to the second user information; and
  sending, by the local area network terminal, confirmation information to the public network server.

2. The method of claim 1, wherein before acquiring, by the local area network terminal, the information about the accessible content on the at least one online device in the local area network, the method further comprises:
  querying, by the local area network terminal, service statuses of devices in the local area network; and
  determining, among the devices in the local area network, the at least one online device whose service status is online.

3. The method of claim 1, wherein after sending, by the local area network terminal, the aggregated information about the accessible content on the at least one online device to the remote client, the method further comprises:
  receiving, by the local area network terminal, a second remote access request message from the remote client, the second remote access request message carrying information about content that the remote client requests to access, and the information being selected by the remote client from the information about the accessible content on the at least one online device;
  acquiring, by the local area network terminal according to the second remote access request message, the content that the remote client requests to access from a media server of a corresponding device; and
  sending, by the local area network terminal to the remote client, the content that the remote client requests to access.

4. The method of claim 3, wherein acquiring, by the local area network terminal according to the second remote access request message, the content that the remote client requests to access from the media server of the corresponding device comprises:
  initiating, by the local area network terminal, a Hypertext Transfer Protocol (HTTP) request to the media server of the corresponding device when the media server of the corresponding device is a digital media server (DMS); and
  receiving, by the local area network terminal, the content that the remote client requests to access from using the HTTP protocol by the media server of the corresponding device.

5. The method of claim 1, wherein the method further comprises:
  receiving, by the local area network terminal, an IP address and a port that are reported by a media server of the at least one online device; and
  maintaining a heartbeat connection to the media server of the at least one online device.

6. The method of claim 1, wherein the information about the content comprises at least one of the following: a name, a size, creation time, update time, a device where the content is located, or a path.

7. A remote access method, comprising:
  receiving, by a remote client, information about accessible content on at least one online device in a local area network from a local area network terminal;
  presenting, by the remote client, the information about the accessible content on the at least one online device, the information about the accessible content comprising a content information table and a device status table, the content information table comprising a location device and a path for the accessible content on the at least one online device, and the device status table comprising a device identification, an Internet Protocol (IP) address, and a service status for online devices in the local area network, and before receiving, by the remote client, the information about the accessible content on the at least one online device in the local area network from the local area network terminal, the method further comprising:
    sending, by the remote client, a second remote connection message to a public network server, the second remote connection message carrying a public network address and a port of the remote client;
    receiving, by the remote client, a public network address and a port of the local area network terminal that are sent according to the second remote connection message by the public network server; and
    sending, by the remote client, a first remote access request message to the local area network terminal such that the local area network terminal sends the information about the accessible content on the at least one online device to the remote client according to the first remote access request message, the second remote connection message further carrying second user information such that the public network server authenticates the remote client according to the second user information, or the public network server searches for the corresponding local area network terminal according to the second user information and first user information that is from the local area network terminal;
  selecting, by the remote client from the information about the accessible content on the at least one online device, information about content that the remote client requests to access;
  sending, by the remote client, a second remote access request message to the local area network terminal, wherein the second remote access request message carries the information about the content that the remote client requests to access; and
  receiving, by the remote client, the content that the remote client requests to access from the local area network terminal.

8. A local area network terminal, comprising:
  a memory comprising instructions; and
  a processor coupled to the memory, the instructions causing the processor to be configured to:
    acquire information about accessible content on at least one online device in a local area network;
    aggregate the information about the accessible content on the at least one online device;

send, to a remote client, the information about the accessible content on the at least one online device, the information about the accessible content comprising a content information table and a device status table, the content information table comprising a location device and a path for the accessible content on the at least one online device, and the device status table comprising a device identification, an Internet Protocol (IP) address, and a service status for online devices in the local area network;

send a first remote connection message to a public network server, the first remote connection message carrying a public network address and a port of the local area network terminal such that the public network server sends the public network address and the port of the local area network terminal to the remote network client;

receive a first remote access request message from the remote client;

send the aggregated information about the accessible content on the at least one online device to the remote client according to the first remote access request message;

receive second user information from the public network server;

authenticate the remote network client according to the second user information;

send confirmation information to the public network server;

receive a second remote access request message from the remote client, the second remote access request message carrying information about content that the remote client requests to access, and the information being selected by the remote client from the information about the accessible content on the at least one online device;

acquire, according to the second remote access request message, the content that the remote client requests to access from a media server of a corresponding device; and send, to the remote client, the content that the remote client requests to access.

9. The local area network terminal of claim 8, wherein the instructions further cause the processor to be configured to:
query service statuses of devices in the local area network; and
determine, among the devices in the local area network, the at least one online device whose service status is online.

10. The local area network terminal of claim 8, wherein the instructions further cause the processor to be configured to:
initiate a Hypertext Transfer Protocol (HTTP) request to the media server of the corresponding device when the media server of the corresponding device is a digital media server (DMS); and
receive the content that the remote client requests to access from using the HTTP protocol by the media server of the corresponding device.

11. The local area network terminal of claim 8, wherein the instructions further cause the processor to be configured to:
receive an IP address and a port that are reported by a media server of the at least one online device; and
maintain a heartbeat connection to the media server of the at least one online device.

12. A remote client, comprising:
a memory comprising instructions; and
a processor coupled to the memory, the instructions causing the processor to be configured to:
receive information about accessible content on at least one online device in a local area network from a local area network terminal;

present the information about the accessible content on the at least one online device, the information about the accessible content comprising a content information table and a device status table, the content information table comprising a location device and a path for the accessible content on the at least one online device, and the device status table comprising a device identification, an Internet Protocol (IP) address, and a service status for online devices in the local area network;

send a second remote connection message to a public network server, wherein the second remote connection message carries a public network address and a port of the remote client;

receive a public network address and a port of the local area network terminal that are sent according to the second remote connection message by the public network server;

send a first remote access request message to the local area network terminal such that the local area network terminal sends the information about the accessible content on the at least one online device to the remote client according to the first remote access request message;

select, from the information about the accessible content on the at least one online device, information about content that the remote client requests to access;

send a second remote access request message to the local area network terminal, wherein the second remote access request message carries the information about the content that the remote client requests to access; and receive the content that the remote client requests to access from the local area network terminal.

* * * * *